Feb. 16, 1960   F. KOEHLER   2,924,932
INDEXING SPRING
Filed Aug. 6, 1956
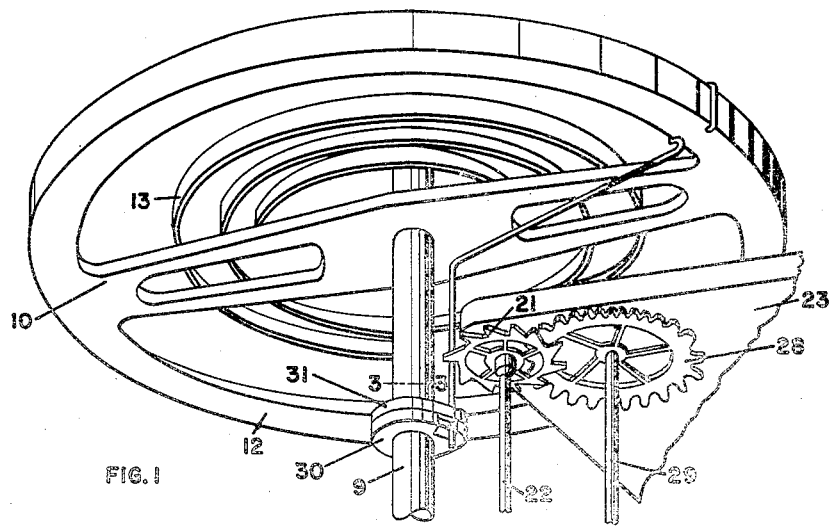
FIG. 1
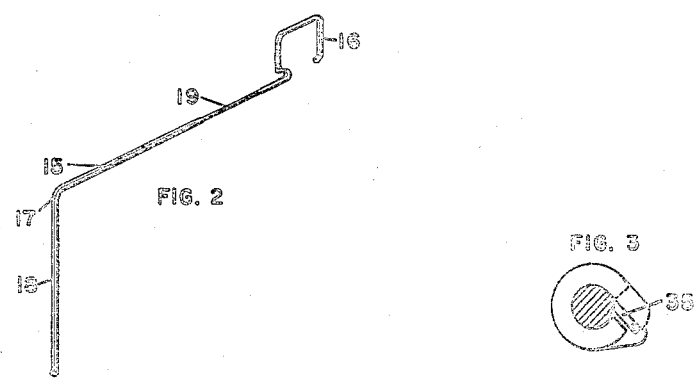
FIG. 2
FIG. 3
INVENTOR
Fred Koehler
BY
ATTORNEY

United States Patent Office 2,924,932
Patented Feb. 16, 1960

2,924,932
INDEXING SPRING

Fred Koehler, Lancaster, Pa., assignor to Hamilton Watch Company, Lancaster, Pa., a corporation of Pennsylvania Application August 6, 1956, Serial No. 602,192

3 Claims. (Cl. 58—28)

This invention relates to a spring indexing finger to be attached to the balance wheel of an electric watch or clock.

In an electric watch or clock powered by a battery, it is necessary to have a periodically impulsed balance wheel providing oscillating motion and to have some means for translating the oscillating motion of the balance wheel to rotary motion of the gear train. Indexing wheels which are advanced one tooth during the oscillation of the balance wheel in one direction and by-passed during the motion of the balance wheel in the other direction are generally used in this motion translating mechanism.

The object of the present invention is to provide a simplified spring which may be attached to the balance wheel and which will serve as an indexing pin adapted to engage one tooth of an indexing wheel when the balance wheel moves in one direction to move the index wheel the distance of one tooth, and to slide over the teeth of the index wheel without resulting movement of the index wheel when the balance wheel is moving in the opposite direction.

It is a still further object of the present invention to provide a simplified spring which may be conveniently and easily replaced by a jeweler or watchmaker should it become worn or broken.

It is a still further object of the present invention to provide a bent spring which is preformed to flex easier in one direction than in another, so that on the return motion of the balance wheel the engagement of the spring with the teeth will utilize as little energy as possible of the balance wheel.

It is a still further object of the present invention to provide an indexing spring which may be quickly and easily attached to the balance wheel without special screws or holding devices by simply fitting one end of the indexing wheel into a holding washer and clamping the other end to the rim of the balance wheel.

The invention is shown in the accompanying drawing in which:

Figure 1 is a perspective view of the balance wheel and indexing wheels of an electric clock or watch powered by a battery, the view being taken looking toward the bottom of the balance wheel.

Figure 2 is a detail view of the indexing spring.

Figure 3 is a cross-section of the balance staff on line 3—3 of Figure 1.

Referring particularly to Figure 1, a balance staff 9 carries a balance wheel 10 having a rim 12 and supports a hairspring 13. A bent spring wire 15 has one end 16 formed to fit the rim of the balance wheel. From the rim, the wire is bent to extend under and substantially parallel to the plane of the balance wheel to reach approximately to the staff 9. The wire is formed with a right angle bend 17 at its midpoint and terminates in a straight portion 18 approximately parallel to the staff. That portion of the wire between the end 16 and the right angle bend 17 is reduced in its lateral cross section at 19 to provide for easy flexure of the wire in a plane substantially parallel to the balance wheel 10.

An indexing wheel 21 is carried on staff 22 mounted at one end in the pillar plate, not shown, and at the other end in a bridge 23. The wheel 21 is formed with teeth having one radial side and one slanting side for respective engagement with the wire during the impulsing and return movement of the balance wheel. Mounted on the shaft 22 is a pinion (not shown) which meshes with gear 28 carried on shaft 29 to actuate the movement.

Secured to the balance staff 9 are a pair of retainer rings 30 and 31, which form the subject of Patent 2,777,279. These rings, when used in conjunction with each other, form a slot 35 which permits the section 18 of the wire to move within the limits of the slot, so that on motion of the balance wheel in one direction the wire 18 will flex at the point 19 and ride on the slanting surface of the teeth of the index wheel 21 to pass wheel 21, while in the other direction the straight section 18 engages the radial side of the teeth, indexing the wheel one tooth, to translate the oscillating motion of the balance wheel to intermittent rotary motion of the wheel 21.

The wire 15 is the element most subject to wear in an electric watch of this type and as such should be quickly, easily and cheaply replaceable. With the construction shown in Patent No. 2,662,366 the indexing spring is difficult to replace and hard to manufacture. The spring of this invention is clipped to the rim of the balance wheel so that it may be easily replaced. It is simple in construction so that it is easy and inexpensive to manufacture.

What is claimed is:

1. In an electric watch, an oscillating balance wheel and staff assembly, said balance wheel being formed with a cross arm and a rim, an indexing gear, a retaining ring carried by said balance staff, and a spring member clipped to the rim of the balance wheel and extending into the path of movement of the gear to be indexed, said spring member being reduced in thickness along a portion of its length parallel to said balance wheel to allow greater flexibility, the oscillatory movement of the balance wheel carried spring member indexing said gear, the free end of said spring member being restrained by the retaining ring.

2. In an electric watch, an oscillating balance wheel and staff assembly, said balance wheel being formed with a cross arm and a rim, an indexing gear, a retaining ring carried by said balance staff, and a spring member clipped to the rim of the balance wheel and extending into the path of movement of the gear to be indexed, said spring member being reduced in one dimension at a portion of its length to allow greater flexibility in a plane parallel to said balance wheel than in a plane perpendicular thereto, the oscillatory movement of the balance wheel carried spring member indexing said gear, the free end of said spring member being restrained by the retaining ring.

3. In an electric watch, an oscillating balance wheel and staff assembly, said balance wheel being formed with a cross arm and a rim, an indexing gear, a retaining ring formed with a slot carried by said balance staff, and a spring member formed at one end to provide a snap fit over the rim of the balance wheel and bent to extend under the cross arm of the balance wheel and at right angles along the balance staff to within the slot of the retaining ring, that portion of its length below the cross arm of the balance wheel being reduced in thickness along one dimension to permit easier flexibility in one direction, and that portion of its length along the balance staff extending into the path of movement of the gear, said spring member engaging and indexing said gear during the oscillation of the balance wheel in one direction, and flexing and moving within the confines of the retaining ring slot to slip past the gear with the balance wheel moving in the other direction.

References Cited in the file of this patent

UNITED STATES PATENTS

| | | |
|---|---|---|
| 2,577,703 | Fillinger | Dec. 4, 1951 |
| 2,590,365 | Anderson | Mar. 25, 1952 |
| 2,644,293 | Black | July 7, 1953 |
| 2,777,279 | Koehler | Jan. 15, 1957 |